United States Patent
Collet

(10) Patent No.: US 8,966,964 B2
(45) Date of Patent: Mar. 3, 2015

(54) METHOD AND DEVICE FOR DETECTING THE PINCHING OF A COUPLING HOSE BETWEEN A TANK AND A GASOLINE VAPOR FILTER

(75) Inventor: Thierry Collet, Toulouse (FR)

(73) Assignees: Continental Automotive France, Toulouse (FR); Continental Automotive GmbH, Hannover (DE)

( * ) Notice: Subject to any disclaimer, the term of this patent is extended or adjusted under 35 U.S.C. 154(b) by 154 days.

(21) Appl. No.: 13/636,894

(22) PCT Filed: Mar. 22, 2011

(86) PCT No.: PCT/EP2011/001401
§ 371 (c)(1),
(2), (4) Date: Oct. 26, 2012

(87) PCT Pub. No.: WO2011/116926
PCT Pub. Date: Sep. 29, 2011

(65) Prior Publication Data
US 2013/0036807 A1    Feb. 14, 2013

(30) Foreign Application Priority Data
Mar. 24, 2010 (FR) .................................. 10 01168

(51) Int. Cl.
*G01M 15/04* (2006.01)
*B60K 15/035* (2006.01)

(52) U.S. Cl.
CPC ..... *B60K 15/03504* (2013.01); *B60K 15/03519* (2013.01); *B60K 2015/03514* (2013.01); *B60K 2015/03523* (2013.01); *B60K 2015/03557* (2013.01); *B60K 2015/03571* (2013.01)

USPC ........................................................ 73/114.39

(58) Field of Classification Search
USPC ............................ 73/114.39, 47, 49.7, 114.38
See application file for complete search history.

(56) References Cited

U.S. PATENT DOCUMENTS 7,503,320 B2 *  3/2009  Collet .......................... 123/698
7,753,035 B2 *  7/2010  Collet .......................... 123/520

(Continued)

FOREIGN PATENT DOCUMENTS

| CN | 1512052 A | 7/2004 |
| CN | 1526938 A | 9/2004 |

(Continued)

OTHER PUBLICATIONS

International Search Report, dated Aug. 12, 2011, from corresponding PCT application, PCT/EP2011/001401.

*Primary Examiner* — Eric S McCall
(74) *Attorney, Agent, or Firm* — Young & Thompson

(57) ABSTRACT

A method for detecting pinching of a coupling hose between a tank and a gasoline vapor filter for a vehicle internal combustion engine, with the vapor filter being connected to the engine via a duct including a controllable bleed valve, includes at least one sequence of a step consisting in opening a bleed valve; a step consisting in acquiring a series of measurements of richness of a mixture entering the internal combustion engine over a period greater than a predetermined value, representative of a bleed period of the gasoline vapor filter; and a step consisting in comparing successive measured values and determining if a variation in richness from one measurement to the next remains below a pre-determined threshold for a group of measurements spread over a period greater than a pre-determined value.

8 Claims, 1 Drawing Sheet

(56) References Cited

U.S. PATENT DOCUMENTS

| | | |
|---|---|---|
| 2004/0112119 A1 | 6/2004 | Watanabe et al. |
| 2004/0173013 A1 | 9/2004 | Kobayashi et al. |
| 2008/0179121 A1 | 7/2008 | Sauvlet et al. |
| 2008/0245347 A1* | 10/2008 | Collet ............ 123/520 |
| 2009/0320926 A1 | 12/2009 | Zelβmann et al. |
| 2013/0000395 A1* | 1/2013 | Collet ............ 73/114.39 |

FOREIGN PATENT DOCUMENTS

| | | |
|---|---|---|
| CN | 1844652 A | 10/2006 |
| DE | 103 23 869 A1 | 12/2004 |
| DE | 10 2008 030 196 A1 | 12/2009 |
| FR | 2 911 313 A1 | 7/2008 |

* cited by examiner

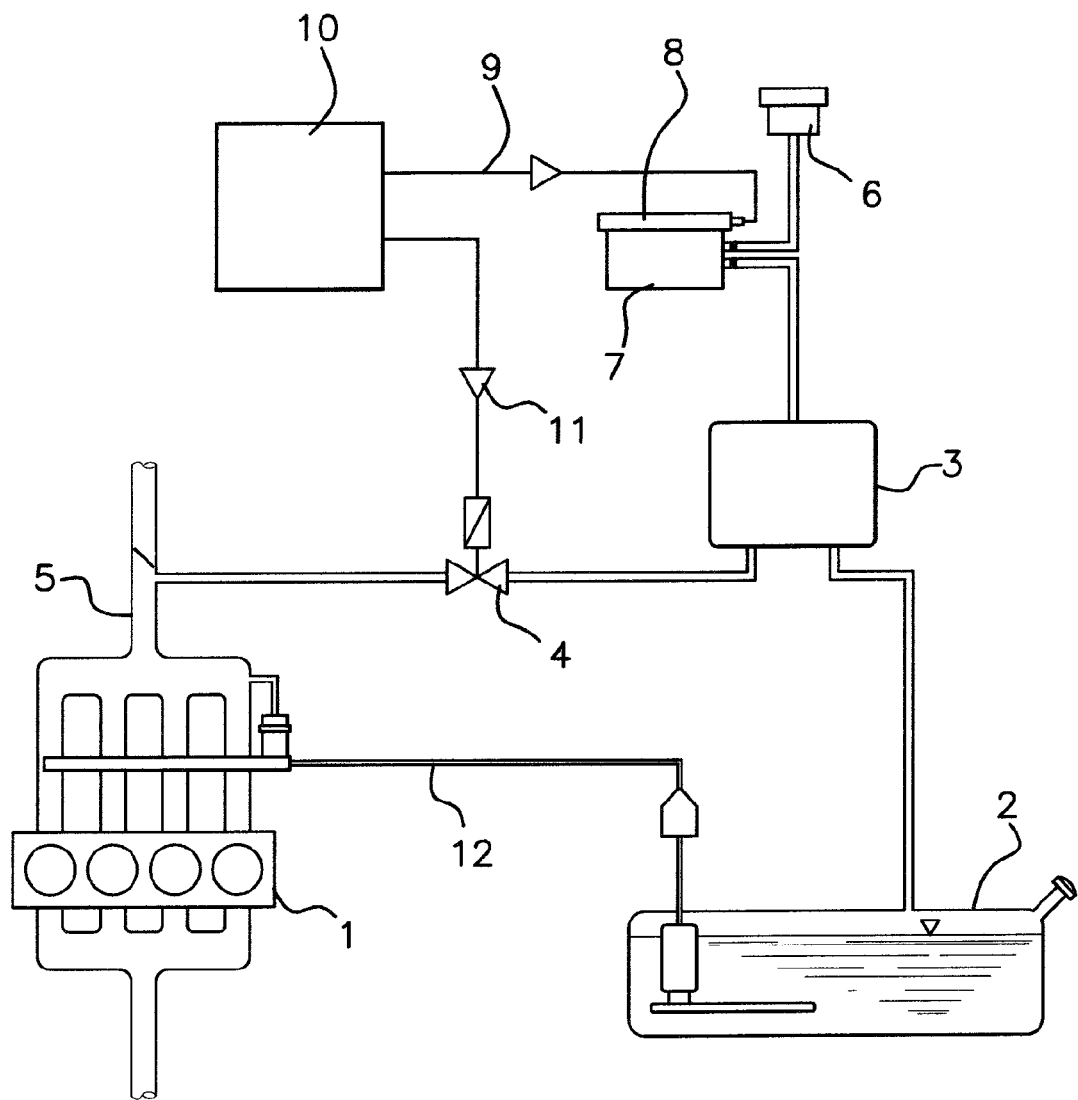

METHOD AND DEVICE FOR DETECTING THE PINCHING OF A COUPLING HOSE BETWEEN A TANK AND A GASOLINE VAPOR FILTER

BACKGROUND OF THE INVENTION

The invention relates to the field of vehicle engines. It relates more particularly to detecting the pinching of a hose connecting the gasoline vapor filter and the gasoline tank which is usually fitted in vehicles provided with a gasoline internal combustion engine.

DESCRIPTION OF THE RELATED ART

For several years now and for the purpose, amongst other things, of reducing pollution generated by vehicles having a gasoline engine, and at the same time for the purpose of reducing the fuel consumption thereof, fuel tanks of said vehicles have been provided with a device for recovering gasoline vapors which reinjects said vapors into the engine. This device, usually denoted the "canister" by the person skilled in the art, is arranged in the vicinity of the gasoline tank. It comprises a carbon filter which fixes the gasoline vapors, in particular when the engine is at a standstill. The injection of the vapors into the engine via the inlet pipe is controlled by the electronic control device of the engine or "ECU" (Engine Control Unit), permitting the opening and the closing of a bleed valve.

Current standards in some countries make it necessary to be able to detect the presence of a leak of gasoline vapors from a vehicle. This involves diagnosing any possible leaks and the malfunction of the components involved, in particular the gasoline vapor filter (canister), the bleed valve and the associated elements, in particular the hoses connecting a fuel tank and a fuel vapor filter.

SUMMARY OF THE INVENTION

The object of the present invention is, therefore, to provide a device permitting the diagnosis of the pinching of a coupling hose between a tank and a gasoline vapor filter.

A second object of the invention is to be simple and inexpensive to implement.

To this end, the object of the invention is a method for detecting the pinching of a coupling hose between a tank and a gasoline vapor filter, for a vehicle internal combustion engine, said vapor filter being connected to the engine via a duct comprising a controllable bleed valve.

The method comprises at least one sequence of the following steps:
  a step consisting in opening the bleed valve,
  a step consisting in acquiring a series of measurements representative of the richness of the mixture entering the internal combustion engine over a period greater than a predetermined value, representative of the bleed period of the gasoline vapor filter,
  a step consisting in comparing successive measured values and determining if the variation in the richness of the mixture from one measurement to the next remains below a pre-determined threshold for a group of measurements spread over a period greater than a pre-determined value.

In one advantageous embodiment, the measurements are acquired continuously when the richness is adjusted.

It goes without saying that it is possible for these measurements to be implemented as long as the detection of leaks continues.

According to various arrangements which are possibly used in combination:
  the measurement of the richness of the mixture of the internal combustion engine is carried out by a lambda probe,
  the method comprises a step for determining the pinching of the coupling hose between the tank and the vapor filter by analyzing the change in the level of the loading of the vapor filter over time.

The objects and advantages of the invention will be understood more clearly by reading the description and the drawings of one particular embodiment given by way of non-limiting example, and of which the drawings show in FIG. 1 a schematic view of the arrangement of the bleed valve of the gasoline vapor filter inside an internal combustion engine.

In the present example, the invention is found in a land vehicle such as an automobile.

BRIEF DESCRIPTION OF THE DRAWING FIGURES

FIG. 1 illustrates the invention.

DETAILED DESCRIPTION OF THE INVENTION

The vehicle, not shown in FIG. 1, comprises an internal combustion engine 1 supplied by fuel contained in a fuel tank 2. The internal combustion engine 1 comprises an air intake manifold 5 and a fuel inlet duct 12 connected to the fuel tank 2.

To collect the fuel vapors emanating from the fuel tank 2, said fuel tank is connected to a vapor filter 3 which is connected to the air intake manifold 5 via a bleed valve 4. The bleed valve is capable of placing the vapor filter 3 and the air intake manifold 5 of the internal combustion engine 1 in communication with one another, on command, so as to recycle at least partially the fuel vapors contained in the vapor filter 3.

The vapor filter 3 is also in communication with an air intake 6 via a vent and a venting valve 7 (known by the term NVLD—Natural Vacuum Leak Detector) capable of placing the vapor filter 3 and the air intake 6 in communication with one another. The venting valve 7 opens when the pressure in the vapor filter 3 exceeds a certain threshold or passes below a certain threshold. This is the case, for example, when the bleed valve 4 is open and the internal combustion engine 1 is in operation. The vacuum thus created in the air intake manifold 5 suctions the fuel vapors contained in the vapor filter 3 and causes the opening of the venting valve 7. Air then passes through the vapor filter 3 and is loaded with fuel vapors before passing into the air intake manifold 5.

The venting valve 7 further comprises a pressostat 8 capable of transmitting a signal according to the level of vacuum in the vapor filter 3. The pressostat 8 delivers its signal via a line 9 to an electronic control unit 10 which may be dedicated to the system or shared with other components of the vehicle such as the internal combustion engine 1. The electronic control unit 10 is capable, in particular, of controlling the opening and closing of the bleed valve 4 via a control line 11.

The vehicle in this case is assumed to be provided with a lambda probe of the type fitted in vehicles with a catalytic converter, capable of measuring the richness of a mixture by detecting the rate of oxygen present in the gas which circulates in front of the lambda probe.

Naturally, and in a substantially continuous manner, the fuel tank 2 of the vehicle fills with vapors, which is due, for example, to the increase in temperature of the fuel, movements of the vehicle, ambient temperature, temperature of the fuel inlet pipe 12, etc. Said emanating fuel vapors are then stored continuously inside the fuel vapor filter 3.

In normal operation, the opening of the bleed valve 4 is controlled by the electronic control unit 10, depending on the level of loading of the vapor filter 3 and the operating point of the engine. The loading of the vapor filter 3 with gasoline is estimated by analyzing the deviation in richness at the exhaust.

The method for detecting the pinching of the coupling hose between a fuel tank 2 and a gasoline vapor filter 3 comprises several steps:
  opening the bleed valve 4 following a command from the electronic control unit 10,
  receiving and storing via the electronic control unit 10 successive measurements of the richness of the mixture, recorded by the lambda probe. Said measurements are, for example, acquired continuously for adjusting the richness,
  comparing successive measured values and determining if the variation in richness from one measurement to the next remains below a pre-determined threshold, for a group of measurements spread over a period greater than a pre-determined value.

This comparison is carried out by calculating the integral of the purge flow (obtained by compensating the mass of fuel injected into the engine) and comparing with a pre-determined threshold.

The two cases are thus:
  either the loading of the vapor filter 3, which is calculated on the basis of compensating the mass of fuel injected into the engine, is and remains below a pre-determined threshold as a result of the bleed mode of the vapor filter 3. This situation is characterized by the fact that the vapor filter 3 is empty and not reloaded with gasoline vapors. This situation is that of a pinched supply hose,
  or, in contrast, the loading of the vapor filter, which is calculated in the same manner, varies over time. This situation is characterized by the vapor filter 3 being gradually reloaded with vapors. The hose between the reservoir 2 and the vapor filter 3 is not pinched.

It goes without saying that the method, as set forth above, permits the diagnosis of the possible pinching of the coupling hose between a tank and a gasoline vapor filter, without having to add a new component due to the use, in particular, of a lambda probe which is currently present on modern vehicles.

The scope of the present invention is not limited to the details of the embodiments above which are considered by way of example, but extends to modifications within the scope of the person skilled in the art.

The invention claimed is:

1. A method for detecting pinching of a coupling hose between a tank (2) and a gasoline vapor filter (3) for a vehicle internal combustion engine (1), said vapor filter (3) being connected to the engine via a duct comprising a controllable bleed valve (4), comprising at least one sequence of the following steps:
   a step consisting in opening the bleed valve (4),
   a step consisting in acquiring a series of measurements representative of a richness of a mixture entering the internal combustion engine (1) over a period greater than a predetermined value, representative of a bleed period of the gasoline vapor filter (3), and
   a step consisting in comparing successive measured values and determining if the variation in richness from one measurement to the next remains below a pre-determined threshold for a group of measurements spread over a period greater than a pre-determined value.

2. The method as claimed in claim 1, comprising a further step of determining the pinching of the coupling hose between the tank (2) and the gasoline vapor filter (3) by analyzing the change in a level of a loading of the vapor filter (3) over time.

3. The method as claimed in claim 1, wherein the measurements representative of the richness of the mixture entering the internal combustion engine (1) are carried out by a lambda probe.

4. The method as claimed in claim 3, comprising a further a step of determining the pinching of the coupling hose between the tank (2) and the gasoline vapor filter (3) by analyzing the change in a level of a loading of the vapor filter (3) over time.

5. The method as claimed in claim 1, wherein the measurements are acquired continuously when the richness is adjusted.

6. The method as claimed in claim 5, comprising a further a step of determining the pinching of the coupling hose between the tank (2) and the gasoline vapor filter (3) by analyzing the change in a level of a loading of the vapor filter (3) over time.

7. The method as claimed in claim 5, wherein the measurements representative of the richness of the mixture entering the internal combustion engine (1) are carried out by a lambda probe.

8. The method as claimed in claim 7, comprising a further a step of determining the pinching of the coupling hose between the tank (2) and the gasoline vapor filter (3) by analyzing the change in a level of a loading of the vapor filter (3) over time.

* * * * *